United States Patent

Harbottle et al.

[11] Patent Number: 5,488,871
[45] Date of Patent: Feb. 6, 1996

[54] BEARING ADJUSTMENT USING COMPRESSIVE FORCE SENSOR

[75] Inventors: William E. Harbottle, North Canton; Mark A. Joki, Dover, both of Ohio

[73] Assignee: The Timken Company, Canton, Ohio

[21] Appl. No.: 195,698

[22] Filed: Feb. 16, 1994

[51] Int. Cl.⁶ .................................................. G01L 5/00
[52] U.S. Cl. ........................................ 73/862.55; 384/448
[58] Field of Search .................................. 384/448, 446, 384/488; 73/862.55, 788

[56] References Cited

U.S. PATENT DOCUMENTS

| | | |
|---|---|---|
| 2,090,188 | 8/1937 | Dahlstrom . |
| 2,133,230 | 9/1937 | Sanders ................................. 384/488 |
| 2,636,964 | 4/1953 | Lancor, Jr. et al. . |
| 3,036,283 | 5/1962 | Singdale et al. . |
| 3,151,480 | 10/1964 | Schultz . |
| 3,313,151 | 4/1967 | Kaye . |
| 3,358,257 | 12/1967 | Painter . |
| 3,826,130 | 7/1974 | Pusch . |
| 4,175,429 | 11/1979 | Keck . |
| 4,203,319 | 5/1980 | Lechler . |
| 4,281,539 | 8/1981 | Keller . |
| 4,341,122 | 7/1982 | Lechler et al. . |
| 4,734,034 | 3/1988 | Maness et al. . |
| 4,762,011 | 8/1988 | Jacob . |
| 4,763,534 | 8/1988 | Hager . |
| 4,856,993 | 8/1989 | Maness et al. . |
| 5,009,523 | 4/1991 | Folger et al. ........................ 384/475 |
| 5,085,519 | 2/1992 | Dougherty ........................... 384/448 |
| 5,140,849 | 8/1992 | Fujita et al. . |
| 5,192,938 | 3/1993 | Ort . |
| 5,221,147 | 6/1993 | Schiel et al. ......................... 384/488 |

Primary Examiner—Thomas P. Noland
Assistant Examiner—Max H. Noori
Attorney, Agent, or Firm—Polster, Lieder, Woodruff & Lucchesi

[57] ABSTRACT

A hub rotates around a spindle on bearings which have angular raceways so that the bearings are capable of carrying both axial and radial loads and may be adjusted into a condition of preload with an axially directed force applied to one of the races, usually the outboard race on the spindle. That force which represents the preload in the bearings, is transmitted through a force sensor which produces a signal that reflects the magnitude of the force. By monitoring the force sensor, one can adjust the bearings to a desired preload.

24 Claims, 3 Drawing Sheets

5,488,871

BEARING ADJUSTMENT USING COMPRESSIVE FORCE SENSOR

BACKGROUND OF THE INVENTION

This invention relates in general to bearings which take axial as well as radial loads and force sensing devices suitable for use in adjusting such bearings, and, more particularly, to a process for adjusting such bearings using a compressive force sensor, to a bearing assembly containing a compressive force sensor, and to a compressive force sensor itself.

Some antifriction bearings, which utilize rolling elements of one type or another between concentric races, have the capacity to transfer axial or thrust loads as well as radial loads, and when single row bearings of this character are organized in pairs, one opposing the other, they are well suited for a wide variety of machine applications, not the least of which is in mountings for the road wheels of automotive vehicles. But the bearings, when so organized, require adjustment during installation to achieve the proper setting for operation. If they are set with too much end play, a limited amount of free radial and axial motion exists in the mounting which may manifest itself in wheel wobble. This instability detracts from the performance of the seals that protect such bearings from contaminants. Furthermore, excessive end play causes the load zone to concentrate at a few rolling elements in each of the two rows, and this may diminish the life of the bearing. Preload, on the other hand, produces a very rigid mounting, but also imparts more friction, and while too much preload may cause the bearings to fail early, a light preload extends bearing life and enhances seal performance.

Most trucks use tapered roller bearings at all wheel locations, and these bearings have the capacity to accommodate radial and axial loads. But the size of the typical wheel bearing for a truck and the mass of the hub which it supports makes the bearings of any pair difficult to adjust on the spindles on which they are mounted. One recommended adjusting procedure, which only adjusts for end play, involves making incremental advances of the nut that holds the bearings on their spindle and between such advances making measurements of end play with a dial indicator. More particularly, the spindle nut is turned to a specific torque while the wheel is oscillated to seat the rollers along the races. Next the nut is backed off one turn and then retightened, again while the wheel is oscillated, until a lesser nut torque is achieved. Then it is backed off again a specified amount. With a jam nut turned down against the spindle nut, the end play is measured using a dial indicator. To this end, the mechanic installs the indicator on the wheel with its stylus against the spindle end and moves the wheel axially back and forth while oscillating it, observing the reading on the indicator as he does, the reading so derived being the end play. If excessive end play appears, the mechanic backs the jam nut off, advances the spindle nut slightly, with the amount being largely based on experience, tightens the jam nut, and makes another measurement. If insufficient end play exists, the mechanic follows essentially the same procedure, but backs the spindle nut off instead of turning it down. This trial and error procedure is repeated until the measured end play falls within an acceptable range.

But for many bearings end play is often not the optimum condition for operating such bearings. It concentrates the radial loads at only a few rollers along the raceways and thereby detracts from the life of the bearing. Moreover, the axial and radial free motion identified with it damages the seals and detracts from their ability to form effective fluid barriers. Preload, when not excessive, extends bearing and seal life. But preload is considerably more difficult to measure than end play.

The present invention resides in a process for quickly adjusting bearings without resorting to trial and error techniques. It enables bearings to be set with a known and controlled preload, all quite easily and in minimum time. The process utilizes a force sensor which is embodied in the bearing arrangement itself, but occupies only a very small amount of space. The invention also resides in the bearing arrangement having the force sensor incorporated into it and in the force sensor itself.

DESCRIPTION OF THE DRAWINGS

In the accompanying drawings which form part of the specification and wherein like numerals and letters refer to like parts wherever they occur.

DETAILED DESCRIPTION

Figure 1:
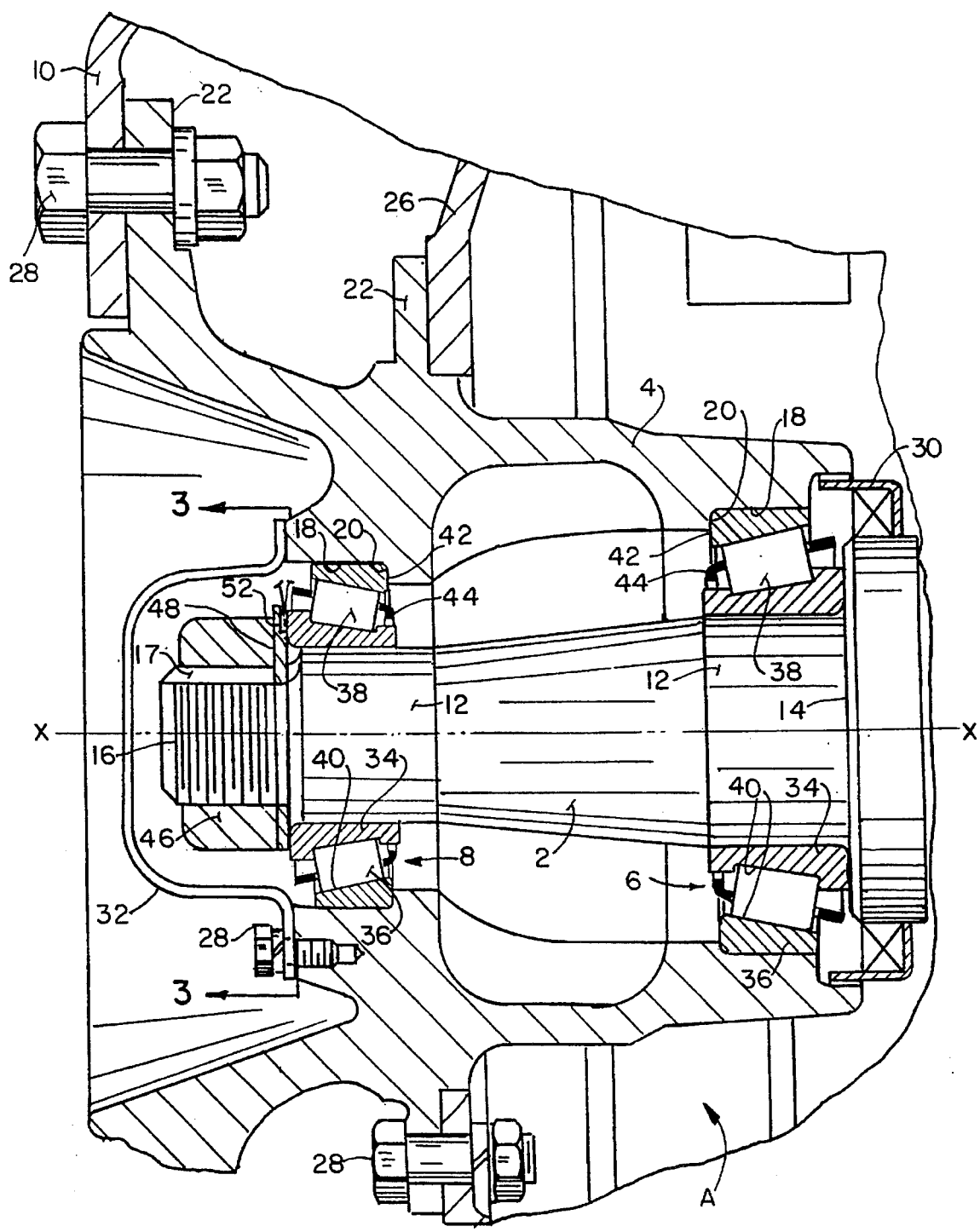
FIG. 1 is a sectional view of a bearing assembly constructed in accordance with and embodying the present invention, the bearing assembly being fitted with a force sensor.

Referring to the drawings, the present invention resides in a bearing assembly A (FIG. 1) that enables one machine component to rotate relative to another machine component about an axis X, which of course coincides with the axis of the bearing assembly A, and also in a procedure for adjusting the bearing assembly A. In the particular example illustrated, the one machine component constitutes a spindle 2, whereas the other is a hub 4 and the two form part of the bearing assembly. In addition, the bearing assembly A includes two single row tapered roller bearings 6 and 8, each of which fits over the spindle 2 and within the hub 4. Here they are mounted in opposition, so that the inboard bearing 6 takes thrust loads in one axial direction and the outboard bearing 8 takes thrust loads in the opposite axial direction. Typically, the spindle 2 is part of the suspension system of an automotive vehicle and the hub 4 has a road wheel 10 attached to it. The bearing assembly A has the capacity to sense a clamping force that is transmitted through its bearings 6 and 8, and thus facilitates adjustment of the bearing assembly A and enables it to be brought to the proper setting with considerable precision.

The spindle 2 has two cylindrical bearing seats 12 (FIG. 1) of different diameters. The inboard seat 12, which is larger in diameter than the outboard seat 12, projects from a shoulder 14, whereas a threaded end 16 extends beyond the smaller seat 12. The threaded end 16 contains an axially directed slot or groove 17. The two bearings 6 and 8 fit around the seats 12.

The hub 4 fits over the spindle 2 and receives the two bearings 6 and 8 in counterbores 18 (FIG. 1) which open out of its ends. Each counterbore 18 terminates at a shoulder 20. The hub 4 has outwardly directed flanges 22 to which the road wheel 10 and a brake drum 26 are attached with machine bolts 28. At the inboard counterbore 18 the hub 4 is further provided with a seal 30 which embraces the spindle 2 to establish a dynamic fluid barrier along the spindle 2. At its outboard end the hub 4 is fitted with an end cap 32. The seal 30 and end cap 32 isolate the interior of the hub 4 and thereby protect the bearings 6 and 8 located in it.

Each bearing 6 and 8, being a single row tapered roller bearing, has an inner race or cone 34 (FIG. 1), an outer race or cup 36 and tapered rollers 38 arranged in a single circumferential row between the cone 34 and cup 36. The tapered side faces of the rollers 38 contact the cone 34 and cup 36 along tapered raceways 40, and those raceways 40 are on apex, meaning that if the raceways 40 were extended to their respective apexes, those apexes would for all intents and purposes lie at a common point along the axis X. The cone 34 and cup 36 each have a back face 42, with the back face 42 of the cone 34 being beyond the large end in the cone raceway 40 and the back face 42 of the cup 36 being at the small end of the cup raceway 40. Thus, the back faces 42 for the cone 34 and cup 36 of either bearing 6 or 8 are presented in opposite directions—and well they should, for they represent the surfaces at which thrust loads are applied to the bearing 6 or 8. In addition, each bearing 6 and 8 has a cage 44 for maintaining the proper spacing between the rollers 38 and for holding the rollers 38 around the cone 34 when the cone 34 is withdrawn from the cup 36.

The cone 34 of the inboard bearing 6 fits over the large bearing seat 12 with a slight clearance fit, its back face 42 being against the shoulder 14 at the end of that seat (FIG. 1). The cup 36 for the inboard bearing 6 fits into the inboard counterbore 18 in the hub 4 with its back face 42 against the shoulder 20 at the inner end of that counterbore 18. The cup 36 of the outboard bearing 8 fits into the outboard counterbore 18 of the hub 4 with its back face 42 against the shoulder 20 of that counterbore. Indeed, the two cups 36 are pressed into their respective counterbores 18, so that an interference fit exists between the hub 4 and the two cups 36, and the cups 36 and their raceways 40 are in effect fixed in position in the hub 4. Finally, the cone 34 of the outboard bearing 8 fits over the outboard bearing seat 12 on the spindle 2 with a slight clearance fit, its back face 42 being presented toward the threaded end 16 of the spindle 2. The bearings 6 and 8, when so oriented, create an indirect mounting—and an indirect bearing mounting will accommodate axial loads in either axial direction, as well as radial loads.

The two bearings 6 and 8 are held on the spindle 2 by a nut 46 (FIGS. 1 & 2) which threads over the threaded end 16 and is turned down against a washer 48, which in turn confronts the back face 42 of the outboard cone 34 to position that cone. Some type of locking device also fits over the threaded end 16 of the spindle 2 to restrain the nut 46 and indeed hold it in the position to which it is turned during installation, for after all the position of the nut 46 on the threaded end 16 of the spindle 2 determines the setting for the two bearings 6 and 8. If the nut 46 is turned down too far, the clamping force imparted by it will drive the rollers 38 too tightly between the tapered raceways 40 and thereby impose an excessive preload. On the other hand, if the nut 46 is not advanced far enough, clearances will exist in the bearings 6 and 8 between the rollers 38 and raceways 40, and this will permit free motion, both radially and axially, or in other words, create a condition of end play. The nut 46 should be turned until the cones 34 of the bearings 6 and 8 are clamped lightly between the nut 46 and shoulder 14—a condition of light preload.

The washer 48 performs the traditional function of spreading the clamping force exerted by the nut 46 more uniformly across the back face 42 of the outboard cone 34. It further has a tongue 50 (FIGS. 2 & 3) which fits into the groove 17 of the spindle 2, so that the washer 48 will not rotate on the threaded end 16 of the spindle 2. The outboard cone 34 has a tendency to creep when the hub 4 revolves, and the washer 48 being incapable of rotating, isolates the nut 46 from the creep of cone 34, so the cone 34 does not turn the nut 46. Apart from that, the washer 50 carries a force sensor 52 that has the capacity to monitor the magnitude of the force transmitted axially through the washer 48, making it possible to determine the clamping force exerted by the nut 46 on the cones 34 of the two bearings 6 and 8 and transmitted through the bearings 6 and 8 into and through the hub 4. That clamping force, of course, represents the preload in the bearings 6 and 8, so the washer 48 and its force sensor 52 are useful in adjusting the bearings 6 and 8 to a desired condition of preload—and the bearings 6 and 8 operate best under light preload.

Figure 2:
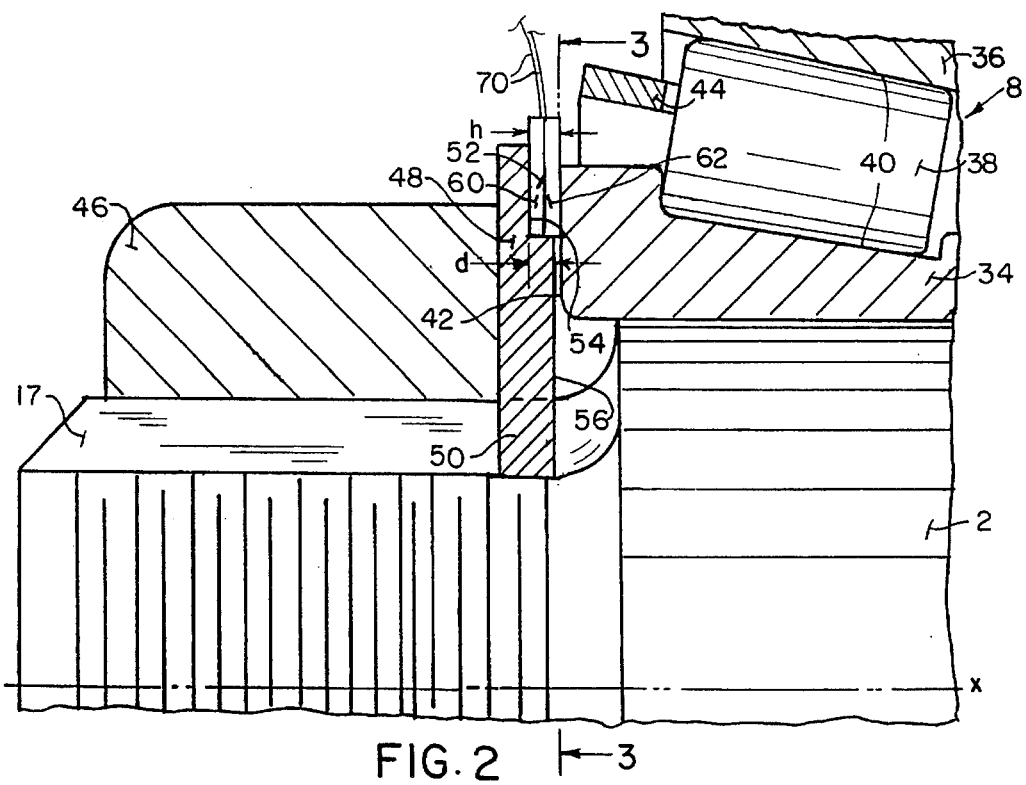
FIG. 2 is an enlarged view of the bearing assembly in the region of its force sensor.

That end of the washer 48 which is presented toward the nut 46 is perfectly flat, that is to say planar, with its surface perpendicular to the axis X of the spindle 2 and bearings 6 and 8. The other end contains a shallow, yet wide groove in the form of a rabbet thus presenting two faces toward the back face 42 of the outboard cone 34 (FIGS. 2 & 3), one being an end or abutment face 54 at the groove and the other being an auxiliary face 56 located closer to the back face 42 of the nearby cone 34. The two faces, both of which are planar and lie in planes perpendicular to the axis X, are offset a distance d (FIG. 2). Moreover, the abutment face 54 has a radial dimension r. The force sensor 52 lies along the abutment face 54 as do two spacers 58, all being arranged at equal circumferential intervals and held against the face 54 with an adhesive. Each possesses the same thickness h which is slightly greater than the offset d between the faces 54 and 56, so that the cell 52 and spacers 58 project axially beyond the auxiliary face 56 of the washer 48. Indeed, the washer 48 does not actually contact the back face 42 of the outboard cone 34; instead, the force sensor 52 and spacers 58 do. Thus, the clamping force exerted by the nut 46 is transferred to the outboard cone 34 through the washer 48 and the force sensor 52 and spacers 58, and this holds true through all magnitudes of preload under which the bearings 6 and 8 may be expected to operate. In other words, even when the force sensor 52 and spacers 58 are compressed under the clamping force exerted by the nut 46, their thickness h will still exceed the offset d between the two faces 54 and 56, so the force sensor 52 and spacers 58 still separate the washer 48 slightly from back face 42 of the outboard cone 34. Typically, the thickness h of the force sensor 52 and spacers 56 is 0.013 inches and the offset between the faces 54 and 56 is 0.012 inches. The radial dimension r of the abutment face 54 to a large measure depends on the size of the bearing 6, but where the bearing 6 is on the spindle for the axle of a heavy truck or trailer, the dimension r is about 0.25 inches.

Figures 3, 4, 5:
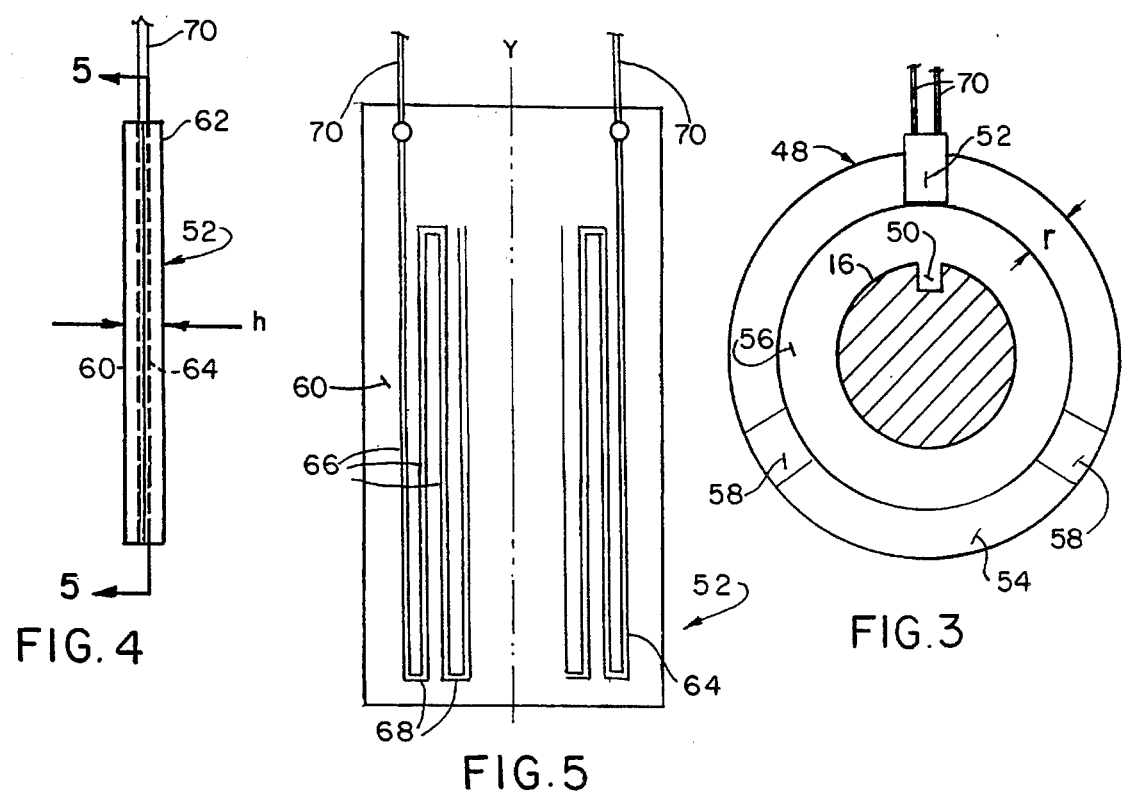
FIG. 3 is a sectional view taken along line 3—3 of FIG. 1, and showing one face of the washer and the force sensor against that face.
FIG. 4 is a side view of the force sensor.
FIG. 5 is a sectional view of the force sensor taken along line 5—5 of FIG. 4.

The force sensor 52 consists of two thin pads 60 and 62 (FIGS. 4 & 5) and a foil strain gage element 64 interposed between the two pads 60 and 62. Each of the pads 60 and 62 is derived from a film of somewhat elastic polymer, such Mylar or polyvinylchloride, which when compressed between flat surfaces is capable of expanding or extruding transversely with respect to the direction of the compressive force. Each, moreover, is about 0.002 to 0.008 inches thick and preferably about 0.006 inches, with its exterior dimension being that of the sensor 52 itself. Each pad 60 has an adhesive on one of its faces. Actually, conventional cellophane tape of the type found in offices and households everywhere, one prominent trademark for such tape being SCOTCH, will suffice for the pads 60 and 62. The foil strain gage element 64 is commercially available. It consists of polymer film onto which a metal, such as iron constantan, is deposited onto one of its faces. The element is about 0.001 inches thick and is organized in zigzag configuration with parallel legs 66 (FIG. 5) and short connecting segments 68 joining the ends of adjacent legs 66 (FIG. 5). Twelve or more legs 66 may exist in the array. The two legs 66 at the sides of the array project beyond the ends of the remaining legs 66 and are connected to leads 70 to which instrumentation may be connected.

The foil strain gage element 64 is smaller than the pads 60 and 62 (FIG. 5). Indeed, the two pads 60 and 62 are brought together with the adhesive-coated face on the pad 62 presented toward uncoated surface of the pad 60 and with their margins in registration and further with the foil element 64 interposed between them, its outermost legs 66 being set inwardly from the side margins of the pads 60 and 62 and its connecting segments 68 being set inwardly from the end margins of the pads 60 and 62. The adhesive coatings on the pad 62 bonds the two pads 60 and 62 together and in effect encapsulate the foil element 64 between them. However, the leads 70 project outwardly beyond the registered margins of the pads 60 and 62 at one side of the cell 52. The adhesive on the other face of the pad 60 holds the entire sensor 52 against the abutment face 54 of the washer 48.

Having a thickness h that is greater than the offset d between the faces 54 and 56, the force sensor 52 projects beyond the auxiliary face 56 of the washer 48 with its pad 62 being presented toward the back face 42 of the outboard cone 34 (FIG. 2). Thus, the sensor 52 lies captured between the washer 48 and the cone 34 with its pad 60 against the abutment face 54 on the washer 48 and its pad 62 against the back face 42 of the cone 34. The spacers 58 lie between the same surfaces at 120° intervals and simply prevent the washer 48 from cocking owing to the presence of the load cell 52 (FIG. 3). In this regard, the spacers 58 possess essentially the same thickness h and elastic properties as the force sensor 52.

Of course, before adjusting the bearings A with the force sensor 52, one must assemble it, and for the most part the assembly procedure is conventional. The two cups 36 are forced into the counterbore 18 of the hub 4 until their back faces 42 abut against the shoulders 20 at the ends of the counterbores 18 (FIG. 1). The cups 36 remain firmly in place by reason of the interference fit. Next the seal 30 is installed in the inboard end of the hub 4. Then the inboard cone 34 and its complement of rollers 38 are advanced over the spindle 2 until the cone back face 42 comes against the shoulder 14. Once the inboard cone 34 is in place, the hub 4, with the two cups 36 and the seal 30 in place, is passed over the spindle 2 until the inboard cup 36 fits around the rollers 38 on the inboard cone 34. Thereupon, the outboard cone 34 and its complement of rollers 38 are passed over the spindle 2 and into the outboard cup 36 with the back face of the cone 34 presented away from the interior of the hub 4. Next, the washer 48 is installed over the threaded end 16 of the spindle 2, with the force sensor 52 and spacers 58 presented toward the outboard cone 34. Finally, the nut 46 is engaged with the threads of the threaded end 16 and turned down lightly against the washer 48.

At this time the two bearings 6 and 8 exist in a condition of end play—a condition characterized by free motion, both axially and radially in the hub 4. But as the nut 46 is advanced further over the threaded end 16 of the spindle 2, it drives the cone 34 of the outboard bearing 8 toward the cone 34 of the inboard bearing 6, thereby reducing the end play. Eventually, the bearings 6 and 8 reach a neutral condition, known as zero end play, in which they have no end play and no preload. Further advancement of the nut 46 beyond the condition of zero end play, of course, places the bearings 6 and 8 in preload and in that condition the two cones 34 lie clamped between the shoulder 14 at one end of the spindle 2 and the nut 46 at the other end—indeed, with a compressive force exerted on them. That compressive force represents the preload, and while a force, it is often expressed as a lineal dimension to maintain consistency with end play which is always expressed as a lineal dimension. In any event, the correlation between preload expressed in units of force and preload expressed in units of linear measure is easily determined.

The force sensor 52, being formed for the most part from polymer, yields under the clamping force transmitted to it through the aubtment face 54 of the washer 48 and the back face 42 of the outboard cone 34, and that force of course derives from the nut 46 which is turned down over the threaded end 16 of the spindle 2. In other words, the thickness h of the load cell 52 decreases. This change in the thickness h translates into an increase in the length and width of the pads 60 and 62, that is to say the pads 60 and 62 extrude parallel to the axis y (FIG. 5) of the foil element 64 and transverse to that axis as well. But the decrease in the thickness h and the lateral extrusion remain within the elastic limits of the polymer from which the pads 60 and 62 are derived. The foil element 64, being clamped between the two pads 60 and 62, undergoes the same expansion. The expansion along the major axis y of the foil element 64 lengthens the legs 66 of the element 64, and this in turn alters the electrical resistance of each leg 66 of the element 64, for it is a well-known characteristic of metal to change resistance when elongated. Since the legs 66 lie in series, their elongation in the presence of the extrusion produces a more pronounced change in the electrical resistance of the entire foil element 64.

In any event, a predetermined relationship exists between the electrical resistance of the foil element 64 in the force sensor 52 and the compressive force applied to the force sensor 54—and that force of course is one-third the preload in the bearings 6 and 8, for the remaining two-thirds of the preload is transmitted through the spacers 58. The correlation between compressive force applied to the force sensor 52 and the electrical resistance of its foil element 64 may be plotted on cartesian coordinates. One can measure the increase in the resistance of the foil element 64 simply by connecting suitable instrumentation to the leads 70 that are exposed on the force sensor 52. Thus, one turns the nut 46 until the instrumentation records a resistance that correlates to the force or preload desired in the bearings 6 and 8 and then secures the nut 46 against rotation with a suitable locking device.

Where the locking device is a jam nut threaded over the end 16 and against the adjusting nut 46, it will displace the nut 46 toward the bearing 8, owing to the tolerances between the threads of the nut 46 nd the end 16, and this displacement will impose a greater preload in the bearings 6 and 8. But the force sensor 52 will detect this increase in preload, and the nut 46 may be backed off slightly to accommodate the displacement produced by the jam nut.

The force sensor 52 and the spacers 58 remain in place when the bearing assembly A, once adjusted, is set in operation. But the bearings 6 and 8 and the brake drum 26 generate heat, and the heat degrades the adhesives which holds the force sensor 52 and spacers 58 in place. Then there is the grease which lubricates the bearings 6 and 8. It migrates out onto the washer 48 and further degrades the adhesives. Finally, during the operation of the bearings 6 and 8, the two cones 34, having been installed with a slight clearance fit, creep on the spindle 2, and this rotation tends to tear the force sensor 52 and spacers 58 from the washer 48.

The absence of the force sensor 52 and the two spacers 58 or any one of them changes the setting of the bearings 6 and 8, but the change is ever so slight, because the force sensor 52 and spacers 58 when compressed project only slightly beyond the end face of the washer 48. When they leave, the auxiliary face 56 of the washer 48 bears against the back face 42 of the outboard cone 34 and this establishes a slightly different setting for the bearings 6 and 8, but they still remain in preload well within a range of settings which affords optimum performance. And they will remain in that condition of preload until the nut 46 is backed off to gain access to the bearings 6 and 8. On truck axles of current manufacture this may be up to one million miles.

In lieu of attaching the force sensor 52 and the spacers 58 to the washer 48 they may be attached to the back face 42 of the outboard cone 34 such that they align with the abutment face 54 on the washer 48. They may also be installed between the shoulder 14 and the back face 42 of the inboard cone 34. Then again, if the cups 36 are fitted to their respective counterbores 18 in the hub 4 with clearance fits, the force sensor 52 and spacers 58 may be fitted between the back face 42 of either one of the cups 36 and the shoulder 20 toward which the cup 36 is presented. But the location between the washer 48 and the outboard cone 34 is the most convenient for indirectly mounted bearings on dead spindles. For directly mounted bearings, the outboard cup would be most accessible, so the force sensor 52 should be between its back face and the abutment toward which that face is presented.

The force sensor 52 enables the bearings 6 and 8 to be adjusted into a condition of preload with considerably more precision than past procedures. Moreover, the procedure requires very little effort and only minimal skills. It is virtually foolproof. The procedure lends itself to factory assembly operations or subsequent maintenance procedures all without requiring modifications in the spindle 2, hub 4 or bearings 6 and 8. Being extremely thin and small, the force sensor 52 easily fits into bearing arrangements of current manufacture.

Bearings other than tapered roller bearings may be adjusted using the force sensor 52, but such bearings should have angular raceways so as to be capable of taking axial as well as radial loads. Also, the force sensor used to monitor the clamping force may rely on other electrical characteristics such as capacitance.

With a slight modification the procedure may be used to adjust the bearings 6 and 8 to a condition of end play. To this end, a spacer of known thickness is installed between the force sensor 52 and the back face 42 of the outboard cone 34. The spacer is not permanent, but instead, will disintegrate when subjected to elevated temperatures or perhaps a solvent. In any event, the nut 46 is tightened until the force sensor 52 registers a desired load, and then the nut 46 is secured. At this time the bearings 6 and 8 exist in a condition of preload. But then the end of the spindle 2 is heated or subjected to a treatment that eliminates the spacer that is behind the force sensor 52. This transforms the setting to one of known end play.

Figure 6:
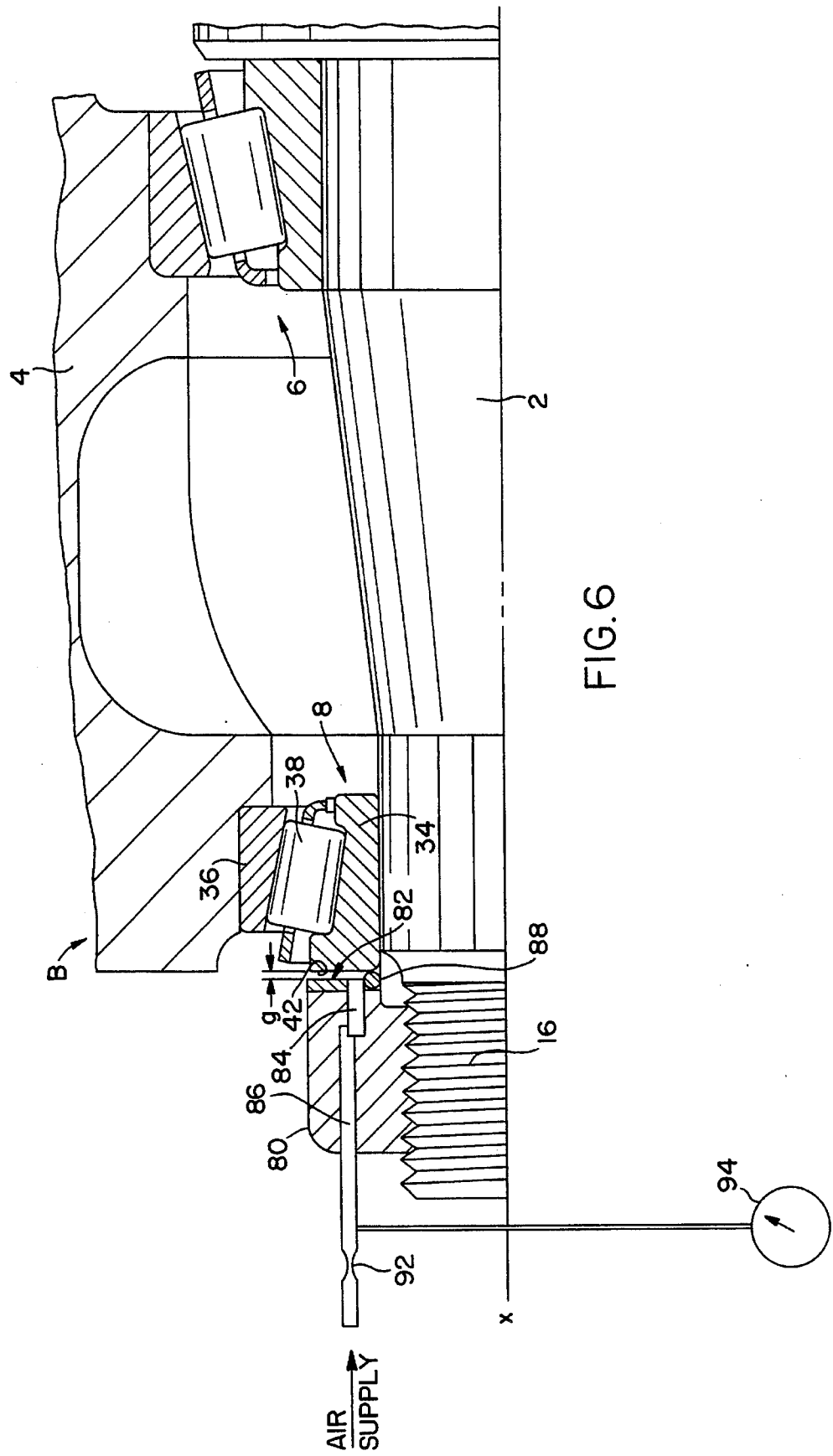
FIG. 6 is a partial sectional view of a bearing assembly provided with a modified force sensor.

The force sensor need not rely on electrical resistance—or for that matter some other electrical characteristic—to measure or even indicate the presence of a force that preloads a bearing assembly. A modified bearing assembly B (FIG. 6) likewise has bearings 6 and 8 which fit between a spindle 2 and a hub 4 in the indirect configuration and enable the hub 4 to rotate relative to the spindle 2 about an axes X. The spindle 2 has a threaded end 16 which leads up to the back face 42 on the cone 34 of the outboard bearing 8. Here the similarities between the bearing assemblies A and B end in that the bearing assembly B relies on a flowing fluid for its adjustment.

The bearing assembly B has a force sensor 78 which includes a nut 80 that is engaged with the threaded end 16 on the spindle 2 and has an end face 82 which is squared off with respect to the axis X and is presented toward the back face 42 of the outboard cone 34. The nut 80 also contains an annular groove 84 which opens out of the end face 82, it having its center at the axis X and being set inwardly from the periphery of the face 82. Within the nut 80, the annular groove 84 communicates with a feed channel 86 which extends axially to the opposite end of the nut 80 out of which it opens.

The nut 80 does not contact the back face 42 of the outboard cone 34, but is instead held away from the cone 34 by compression ring 88 which is located between the end face 82 of the nut 80 and the back face 42 of the cone 34, it also forming part of the force sensor 78. The ring 88 encircles the spindle 2, but has a diameter less than the groove 84, so that it does not obstruct the groove 84. As a consequence, a gap exists between the back face 42 of the outboard cone 34 and the end face 82 of the nut 80, that gap having a width g. As the nut 80 is turned down over the threaded end 16, it compresses the ring 88, first plastically and then elastically, and with this compression the width g of the gap narrows, but the gap is never entirely eliminated.

The axial feed channel 86 in the nut 80 is connected to a feed tube 90 which contains a restriction 92, and beyond the restriction the feed tube 90 is connected to a source of compressed air. Downstream from the restriction 92 a pressure gage 94 is connected to the feed tube 90 to monitor the pressure in the feed tube 92.

A correlation exists between the pressure in the feed tube 90, as registered on the gage 94, and the width g of the gap between the cone back face 42 and end face 82 on the nut 80, whereas another correlation exists between the width g of the gap and the compressive force transferred through the compression ring 88. Thus, the compressive force and the pressure are related and may be plotted against each other to provide a graph.

To set the bearing assembly B to a desired preload, one simply turns the nut 80 down over the threaded end 16 of the spindle 2, while directing pressurized air through the feed tube 90 and channel 86. The air escapes through the gap between the back face 42 of the outboard cone 34 and the end face 82 of the nut 80, but the gap restricts the flow and produces back pressure in the fluid. The gage 94 registers that back pressure. The assembler monitors the pressure registered by the gage 94, and may rotate hub 4 contemporaneously to insure that the rollers 38 of the two bearings 6 and 8 seat properly along the raceways 40. The nut 80 is advanced until the pressure registered at the gage 94 correlates with the desired preload for the bearings 6 and 8.

This invention is intended to cover all changes and modifications of the example of the invention herein chosen for purposes of the disclosure which do not constitute departures from the spirit and scope of the invention.

What is claimed is:

1. An assembly comprising: a first machine component; a second machine component; a first bearing located between the machine components for enabling one of the components to rotate relative to the other about an axis of rotation, the bearing including a raceway carried by the second component, a race mounted on the first component and having a raceway presented toward the raceway of the second component and rolling elements located between and contacting the raceways, the raceways being oriented at oblique angles with respect to the axis such that the rolling elements will transmit axial as well as radial loads between the race and the second component, the race having the capacity to shift axially on the first component when not restrained, whereby a force exerted in one axial direction on the race will shift the race on the first component and cause the rolling elements to seat along the raceways; force exerting means for applying an axially directed force on the race in said one direction, whereby the force seats the rolling elements along the raceways and is transmitted through the rolling elements to the second component; and force sensing means for detecting the magnitude of the force exerted on the race by the force means, the force sensing means being located such that the force exerted by the force exerting means on the race is transmitted generally axially at least in part through the force sensing means.

2. An assembly according to claim 1 wherein the force sensing means lies at least in part between the force means and the race.

3. An assembly according to claim 1 wherein the force sensing means is compressed under the force applied by the force exerting means.

4. An assembly according to claim 3 wherein the force sensing means includes first and second elastic pads arranged parallel to each other and essentially in a plane generally perpendicular to the axis, the pads having the capacity to extrude laterally in that plane when subjected to a compressive force, and and electrical element interposed between the pads such that it elongates and undergoes a change in electrical characteristics when the pads extrude.

5. An assembly according to claim 3 wherein the force sensing means includes a compression ring between the race and the force exerting means where it transfers the force applied by the force-exerting means to the race, a surface which is carried by the force exerting means and is presented toward the race such that a gap exists between the race and the surface with the size of the gap being dependent on the extent that the compression ring is compressed, and means for introducing a fluid into the gap and measuring the pressure of the fluid as a consequence of the gap, whereby the pressure will vary with the size of the gap.

6. An assembly according to claim 3 and further comprising: a second bearing between the first and second components, the second bearing including a raceway carried by the first component and another raceway carried by the second component and rolling elements located between and contacting the raceways, the raceways of the second bearing being oriented at angles with respect to the axis such that force applied by the force exerting means is also transferred through the second bearing.

7. In combination with a first machine component and a second machine component, one of which rotates relative to the other about an axis of rotation on an antifriction bearing which includes a first race on the first machine component, a second race on the second machine component, and rolling elements between the races, the races having raceways along which the rolling elements roll, with the raceways being at oblique angles to the axis of rotation such that the rolling elements will transmit both radial and axial loads between the races, the first race having a back face at which axial loads are applied to the race; the improvement comprising: an end surface located along the first machine component where it is presented toward the back face of the first race; force means for advancing the end surface along the first machine component and for exerting an axially directed force in the region of the surface; and a force sensor interposed between the end surface and the back face of the first race for transmitting at least some of the axial force applied by the force means to the first race and for further indicating the magnitude of the force.

8. The combination according to claim 7 wherein the force sensor provides an electrical signal that reflects the magnitude of the axial force transmitted through it.

9. The combination according to claim 8 wherein the force sensor includes an electrical resistance element, the configuration and electrical resistance of which changes in response to changes in the axial force transmitted through the load cell.

10. The combination according to claim 9 wherein the force sensor includes first and second elastic pads located against the end surface and the back face of the first race, respectively, the pads having the capacity to expand parallel to the end surface and the back face in response to an axial load transmitted through the force sensor; and wherein the resistance element is located between the pads and elongates when the pads expand parallel to the surface and back face.

11. The combination according to claim 10 wherein the pads are joined together with an adhesive.

12. The combination according to claim 10 wherein the resistance element has a plurality of parallel legs and connecting segments joining adjacent legs at their ends such that the legs are organized electrically in series.

13. The combination according to claim 12 wherein the resistance element is a foil.

14. The combination according to claim 9 wherein the end surface is set back from an auxiliary surface which is also presented toward the back face of the first race, and the force sensor projects slightly beyond the auxiliary surface, whereby if the force sensor is displaced from its normal location between the end surface and the back face of the first race, the back face will come against the auxiliary surface and the setting of the bearing will not change appreciably.

15. The combination according to claim 14 wherein the first machine component has threads; wherein the force means is a nut which engages the threads; and wherein a washer is interposed between the force means and the back face of the first race, the end surface and the auxiliary surface being on the washer.

16. The combination according to claim 9 wherein the first machine component has threads; wherein the force means is a nut which engages the threads; and wherein a slight clearance fit exists between the first race and the first machine component.

17. An assembly comprising: an outer component having a hollow interior; an inner component which extends into the interior of the outer component, the inner component having an abutment and threads spaced from the abutment; a pair of bearings located between the inner and outer components to enable one component to rotate relative to the other about an axis of rotation, each bearing having an inner race located around the inner component, an outer race located in the outer component and rolling elements between the inner and outer races, the races having raceways along which the rolling elements roll with each raceway being at an angle to the axis of rotation, such that the rolling elements will transfer both radial and axial loads between the races, the inner races having back faces at which axial loads are applied to those races, the back face of the one inner race being against the abutment that is along the inner component, the back face of the other inner race being in the region of the threads; a nut engaged with the threads; and a force sensor interposed at least in part between the nut and the back face of said other inner race such that when the nut is turned down over the threads, it imposes an axial clamping force which is transferred at least in part through the force sensor, as well as through the bearings, and the outer component to the abutment on the inner component, the force sensor having the capacity to detect variations in the clamping force applied by the nut.

18. The assembly according to claim 17 wherein the force sensor undergoes a variation in electrical characteristics with variations of the clamping force transmitted through it.

19. The assembly according to claim 18 wherein the force sensor lies between two parallel surfaces which are perpendicular to the axis of rotation and the force sensor includes first and second pads formed from an elastic material which will expand parallel to the two surfaces when compressed and also includes an electrical resistance element which is between the pads such that it elongates when the pads expand and thereby undergoes a change in electrical resistance.

20. The assembly according to claim 19 wherein one of the parallel surfaces is the back face of the cone that is in the region of the threads and the other is on a washer that is interposed between the force sensor and the nut.

21. The assembly according to claim 20 wherein the inner race that is in the region of the threads fits around the inner component with a slight clearance fit.

22. A process for adjusting a bearing that establishes an axis of rotation and has inner and outer races and rolling elements between the races, the rolling elements contacting the races along raceways on the races and the raceways being at oblique angles to the axis of rotation such that the rolling elements will transfer both radial and axial loads between the races, one of the races having a back face at which the axial loads are applied to that race, said process comprising: applying an axially directed force to said one race at its back face; transferring at least a portion of the force through a force sensor that is capable of producing a response that reflects the magnitude of the axially directed force that is transferred; and monitoring the signal derived from the force sensor.

23. The process according to claim 22 wherein the force sensor contains an electrical resistance element, the resistance of which changes in response to the force, and the step of monitoring the signal includes monitoring the electrical resistance of the element.

24. The process according to claim 23 wherein the force sensor includes elastic pads which expand transverse to the axis of rotation in the presence of a compressive force and elongate the resistance element when expanded.

* * * * *